(12) United States Patent
Bok et al.

(10) Patent No.: US 9,569,099 B2
(45) Date of Patent: Feb. 14, 2017

(54) METHOD AND APPARATUS FOR DISPLAYING KEYPAD IN TERMINAL HAVING TOUCH SCREEN

(71) Applicant: Samsung Electronics Co., Ltd., Gyeonggi-do (KR)

(72) Inventors: Ilgeun Bok, Seoul (KR); Chulwoo Kim, Gyeonggi-do (KR); Seungah Oh, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 608 days.

(21) Appl. No.: 13/707,926

(22) Filed: Dec. 7, 2012

(65) Prior Publication Data
US 2013/0179845 A1 Jul. 11, 2013

(30) Foreign Application Priority Data
Jan. 5, 2012 (KR) .......................... 10-2012-0001318

(51) Int. Cl.
| | | |
|---|---|---|
| *G06F 3/00* | (2006.01) | |
| *G06F 9/00* | (2006.01) | |
| *G06F 17/00* | (2006.01) | |
| *G06F 3/0488* | (2013.01) | |

(52) U.S. Cl.
CPC ....... *G06F 3/04883* (2013.01); *G06F 3/04886* (2013.01)

(58) Field of Classification Search
CPC ..... G06F 3/017; G06F 3/0488; G06F 3/04842

USPC .................................................. 715/863, 773
See application file for complete search history.

(56) References Cited

U.S. PATENT DOCUMENTS

| | | |
|---|---|---|
| 2004/0130575 A1 | 7/2004 | Tai et al. |
| 2008/0046496 A1 | 2/2008 | Kater |
| 2008/0259039 A1 | 10/2008 | Kocienda et al. |
| 2008/0284744 A1 | 11/2008 | Park et al. |
| 2008/0318635 A1 | 12/2008 | Yoon et al. |
| 2009/0295750 A1 | 12/2009 | Yamazaki et al. |
| 2010/0088641 A1 | 4/2010 | Choi |
| 2012/0144337 A1* | 6/2012 | Archer et al. ................ 715/773 |

FOREIGN PATENT DOCUMENTS

KR    10-1039284 B1    6/2011

OTHER PUBLICATIONS

European Search Report dated Feb. 18, 2016.

* cited by examiner

*Primary Examiner* — Jeffrey A Gaffin
*Assistant Examiner* — Sabrina Greene
(74) *Attorney, Agent, or Firm* — Cha & Reiter, LLC

(57) ABSTRACT

A method and an apparatus thereof display a key pad and solve the trouble and difficulty of a user in selecting the key pad displayed in a terminal having a touch screen. The method detects a touch gesture with respect to the touch screen; determines whether the detects touch gesture is zoom-out; displays thumbnails representing key pads, respectively, when the detected touch gesture is the zoom-out; and displays a key pad of a selected thumbnail when one of the displayed thumbnails is selected by a user.

19 Claims, 10 Drawing Sheets

METHOD AND APPARATUS FOR DISPLAYING KEYPAD IN TERMINAL HAVING TOUCH SCREEN

CLAIM OF PRIORITY

This application claims, pursuant to 35 U.S.C. §119(a), priority to and the benefit of the earlier filing date of a Korean patent application filed on Jan. 5, 2012 in the Korean Intellectual Property Office and assigned Serial No. 10-2012-0001318, the entire disclosure of which is hereby incorporated by reference.

BACKGROUND OF THE INVENTION

1. Field of the Invention

The present invention relates to a method and an apparatus for displaying a key pad, and more particularly, to a method for displaying a key pad for data input in a terminal having a touch screen, and an apparatus thereof.

2. Description of the Related Art

In recent years, with the significant development of information and communication technology and semiconductor technology, supply and use of all types of portable terminals have rapidly increased. In particular, recent portable terminals have developed to a mobile convergence stage including traditional unique fields and other terminal fields. Further, a portable terminal in the prior art may include a touch screen and performs various functions in response to a touch gesture.

The portable terminal stores various key pads such that a user may input various data through a touch screen. Here, the key pads may be classified by types of data. That is, the key pads may be classified into a character key pad, a numeric key pad, and a sign or symbol key pad. Further, the key pads may be classified by forms. That is, the key pads may be classified into a QWERTY key pad, a 3*4 key pad, and a split key pad. In addition, in the prior art, the portable terminal separately displays a button or a menu screen for selecting a key pad. That is, a user touches the button or the menu screen to select a desired key pad. Further, the portable terminal in the prior art displays a key pad selected by the user among the key pads as described above. However, since there are various key pads, it is inconvenient and complicated for a user to select a specific key pad. That is, to call or access a desired key pad, the user repeatedly touches a selection button of the key pad or repeatedly calls or accesses the menu screen. This may be a cumbersome procedure.

SUMMARY OF THE INVENTION

The present invention has been made in view of the above problems, namely, to solve and eliminate the trouble and difficulty of a user in selecting a key pad and provides a method for displaying a key pad which allows a user to easily and rapidly select a desired key pad among various key pads, and an apparatus thereof.

The present invention further provides a method for displaying a key which may easily reduce or enlarge a selected key pad, and an apparatus thereof.

The present invention further provides a method for displaying a key pad which may easily move a selected key pad to a desired location on a screen.

In accordance with an aspect of the present invention, a method for displaying a key pad in a terminal having a touch screen includes: detecting a touch gesture with respect to the touch screen; determining whether the detected touch gesture is a zoom-out gesture; displaying thumbnails indicating key pads, respectively when the detected touch gesture is the zoom-out gesture; and displaying a key pad of a selected thumbnail when one of the displayed thumbnails is selected by a user.

In accordance with another aspect of the present invention, an apparatus for displaying a key pad includes: a touch screen for generating a touch event in response to a touch gesture of a user; a controller for detecting the touch gesture from a touch event input from the touch screen, determining the detected touch gesture, and controlling display of the key pad according to the determination result; and a display unit for displaying thumbnails indicating key pads, respectively, and displaying one key pad corresponding to one of the thumbnails.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Figure 1:
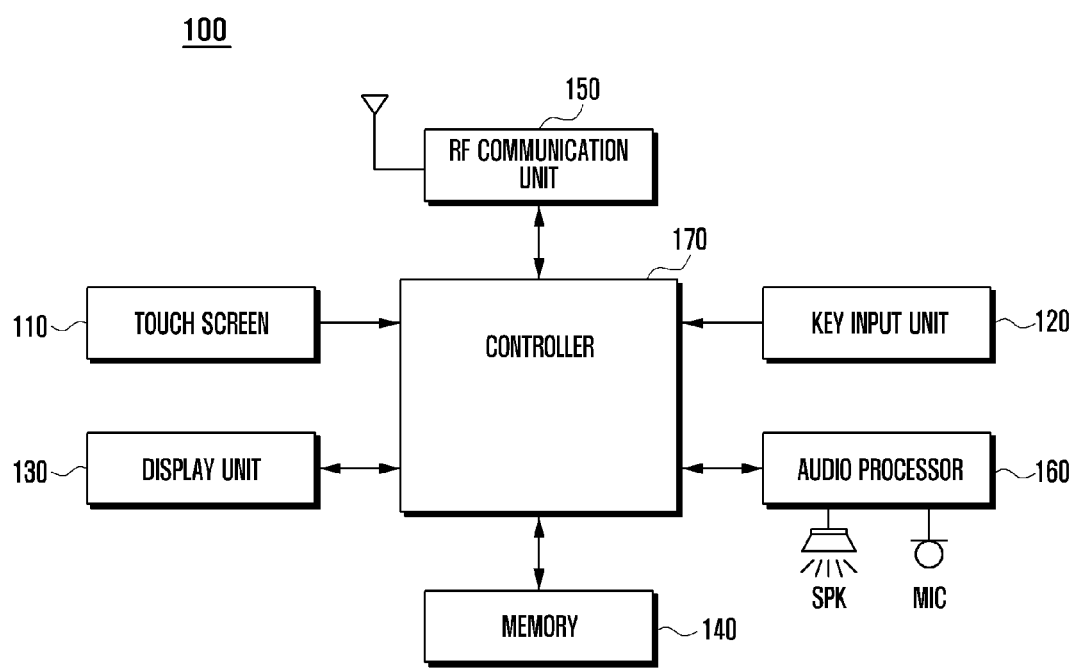
FIG. 1 is a block diagram illustrating a configuration of a portable terminal according to an exemplary embodiment of the present invention.

A method and apparatus for displaying a key pad according to preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention may, however, be embodied in many different forms and should not be construed as limited to the exemplary embodiments set forth herein. Also, terms described herein, which are defined considering the functions of the present invention, may be implemented differently depending on user and operator's intention and practice. Therefore, the terms should be understood on the basis of the disclosure throughout the specification. The principles and features of this invention may be employed in varied and numerous embodiments without departing from the scope of the invention.

Furthermore, although the drawings represent exemplary embodiments of the invention, the drawings are not necessarily to scale and certain features may be exaggerated or omitted in order to more clearly illustrate and explain the present invention.

As used herein, a terminal refers to any kind of device capable of processing data which is transmitted or received to or from any external entity. The terminal may display icons or menus on a screen to which stored data and various executable functions are assigned or mapped. The terminal may include a computer, a notebook, a tablet PC, a mobile device, and the like.

As used herein, a screen refers to a display or other output devices which visually display information to the user, and which optionally are capable of receiving and electronically processing tactile inputs from a user using a stylo, a finger of the user, or other techniques for conveying a user selection from the user to the output devices.

As used herein, an icon refers to a graphical element such as a figure or a symbol displayed on the screen of the device such that a user can easily select a desired function or data. In particular, each icon has a mapping relation with any function being executable in the device or with any data stored in the device and is used for processing functions or selecting data in the device. When a user selects one of the displayed icons, the device identifies a particular function or data associated with the selected icon. Then the device executes the identified function or displays the identified data.

As used herein, data refers to any kind of information processed by the device, including text and/or images received from any external entities, messages transmitted or received, and information created when a specific function is executed by the device.

As used herein, the term "thumbnail" refers to a displayed object such that a user intuitively knows or identifies an associated application or data corresponding to the thumbnail. In particular, in the present invention, the term "thumbnail" refers to a thumbnail of a key pad. The thumbnail of the key pad may be displayed text or an image indicating a form and an input mode of the key pad. Accordingly, before the key pad is displayed, the user may intuitively recognize a form of a corresponding key pad or a type of input data through the thumbnail.

As used herein, the term "zoom-out" refers to a touch gesture for calling or accessing thumbnails indicating key pads, respectively. Further, in the present invention, the "zoom-out" may indicate a touch gesture for reducing a displayed key pad. A touch gesture in which a user reduces an interval of two fingers in a touched state on a touch screen may be a representative example of the zoom-out. In this case, thumbnail calling and reduction of the key pad may be classified due to a difference of the speed or rate of widening the two fingers. That is, when the speed difference of drag and sweep among the touch gestures is distinguished, the thumbnail calling and the reduction of the key pad may be distinguished due to the speed difference. For example, when the speed is greater than a preset value, the zoom-out initiates the thumbnail calling or accessing. When the speed is less than or equal to the preset value, the zoom-out does not initiate the thumbnail calling or accessing, but instead reduces the image of the keypad. In addition, the thumbnail calling and the reduction of the key pad may be distinguished according to the size of a pinch or the key pad. Here, the pinch gesture refers to a distance between two touched points. For example, as the user zooms out, the key pad may be reduced. If the size of the pinch or the key pad is less than a preset value while the key pad is reduced, the reduction of the corresponding key pad is terminated and a thumbnail list may be displayed.

As used herein, the term "zoom-in" refers to a touch gesture for enlarging a displayed key pad. That is, the zoom-in is an opposite concept of the zoom-out. The zoom-in may correspond to a touch gesture in which a user increases an interval of two fingers in a touched state on a touch screen.

The method and the apparatus for displaying a key pad according to the present invention are applicable to a terminal with a touch screen, and in particular, a portable terminal. For example, the portable terminal is a portable phone, a smart phone, a tablet PC, a hand-held PC, a Portable Multimedia Player (PMP), or a Personal Digital Assistant (PDA). Hereinafter, in the exemplary embodiments describing the present invention, a method and an apparatus for displaying a key pad according to the present invention are applied to a portable terminal.

The method and the apparatus for displaying a key pad according to the present invention is applied to a terminal, and in particular, the portable terminal as illustrated above, and a user using the terminal calls or accesses a thumbnail in response to zoom-out and zoom-in, and reduces or enlarges a key pad. A characteristic function of the present invention will be described in greater detail below. In describing the present invention, well-known functions or constructions will not be described in detail since they may unnecessarily obscure the understanding of the present invention.

FIG. 1 is a block diagram illustrating a configuration of a portable terminal 100 according to an exemplary embodiment of the present invention. Referring to FIG. 1, the portable terminal 100 may include a touch screen 110, a key input unit 120, a display unit 130, a memory 140, a radio frequency (RF) communication unit 150, an audio processor 160, a microphone MIC, a speaker SPK, and a controller 170.

The touch screen 110 is mounted at a front surface of the display unit 130, or alternatively is included in the display unit 130, generates a touch event in response to a touch gesture of a user with respect to the touch screen 110 and transfers the touch event to the controller 170. Accordingly, the controller 170 may sense a touch gesture of a user from a touch event input to the touch screen 100 and controls the foregoing structural elements in response to the detected touch gesture. Here, the touch gesture may be classified into touch, long tap, drag, and sweep. The touch is an operation where a user pushes, presses, or otherwise contacts one point of a screen. The tap is an operation where a finger is removed from a corresponding point without movement of the finger after touching one point. The long tap is an operation where a finger is removed from a corresponding point without movement of the finger after touching one point longer than the tap. The drag is an operation that moves a finger in a predetermined direction in a state in which one point is touched. The sweep is called a flick, which is an operation that removes a finger after moving the finger by bouncing the finger on the touch screen 100 at a relatively high speed. Further, a resistive type, a capacitive type, and a pressure type of touch screen are applicable as the touch screen 110.

A key input unit 120 may include a plurality of input keys and function keys for receiving input of numeric and character information, and for setting various functions. The function keys may include arrow keys, side keys, and hot keys set such that a certain function is executed. Further, the key input unit 120 generates a key event associated with a user setting and function control of the portable terminal 100 and transfers the generated key event to the controller 170. The key event may be classified into a power on/off event, a volume control event, and a screen on/off event. The controller 170 may control the foregoing configurations in response to the key event.

The display unit 130 converts digital data input from the controller 170 into analog data and displays the analog data. That is, the display unit 130 may display various screens, for example, a lock screen, a home screen, an application execution screen, a menu screen, a key pad, and a thumbnail list. An application is hereinafter referred to as an 'App'. The lock screen may be defined as a displayed image when the touch screen of the display unit 130 becomes locked. If a touch gesture or another acceptable input for a lock release is detected, the controller 170 may switch the displayed image from the lock screen to a home screen or an App execution screen. The home screen may be defined as an image including a plurality of App icons corresponding to a plurality of Apps. If one of a plurality of App icons is selected by a user, the controller 170 executes a corresponding App. Further, the display unit 130 displays an execution screen of the selected App. Moreover, the display unit 130 may display one of the screens as a main screen and displays the other screen as a sub-screen overlapping the main screen. For example, the display unit 130 may display an App execution screen, and display a key pad or a thumbnail list either above, overlapping, or covering the App execution screen. Further, the display unit 130 may be implemented as a flat panel display such as a Liquid Crystal Display (LCD), an Organic Light Emitted Diode (OLED), or an Active Matrix Organic Light Emitted Diode (AMOLED).

The memory 140 may store various data such as text, audio, and video as well as an operating system (OS) and various applications of the portable terminal 100. The memory 140 may include a data area and a program area. The data in the data area of the memory 140 are generated by the portable terminal 100 or externally downloaded data are stored in the data area of the memory 140 according to use of the portable terminal 100. Further, the data area may store the previously mentioned screens displayed on the display unit 130, various preset values for operating the portable terminal, and copied data for insertion, for example, into the screens. The program area of the memory 140 may store an operating system (OS) and various applications for booting the portable terminal 100 and for operating the foregoing structural elements of the portable terminal 100.

The RF communication unit 150 may perform a voice call, a mobile call, and data communication and reception of digital broadcasting. To perform such operations, the RF communication unit 150 may include a mobile communication module (e.g., 3-generation mobile communication module, 3.5-generation mobile communication module or 4-generation mobile communication module, etc.), a near distance communication module (e.g., Wi-Fi module), and a digital broadcasting module (e.g., DMB module).

The audio processor 160 converts digital audio input from the controller 170 into analog audio and transmits the converted analog audio to the speaker SPK under control of the controller 170. The audio processor 160 converts analog audio such as voices input from the microphone MIC into digital audio and transfers the digital audio to the controller 170.

The controller 170 controls an overall operation of the portable terminal 100, controls signal flow between internal structural elements in the portable terminal 100, and processes data. Further, the controller 170 may control a supply of power to internal structural elements from a battery or other power sources. The controller 170 may execute various applications stored in the program area. In particular, the controller 170 may include a key pad display controller as illustrated in FIG. 2.

Figure 2:
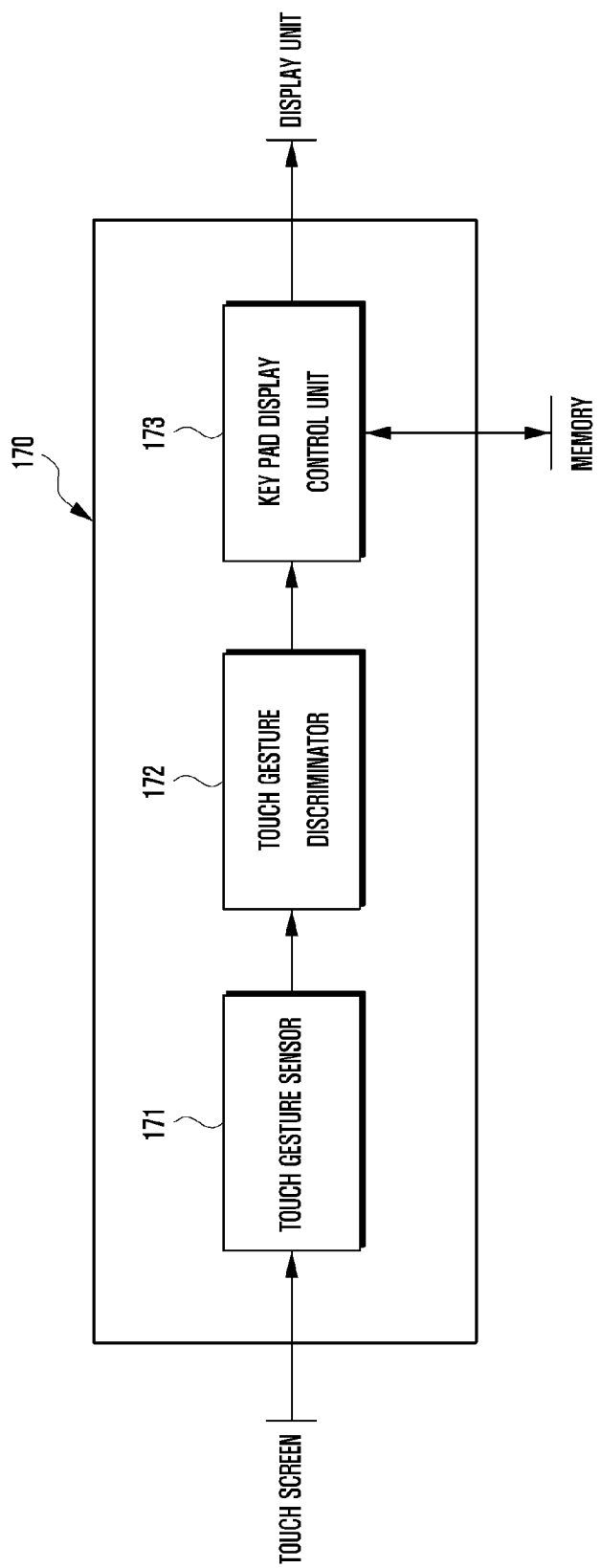
FIG. 2 is a block diagram illustrating a configuration of a controller according to the exemplary embodiment of the present invention.

FIG. 2 is a block diagram illustrating a configuration of a controller 170 according to the exemplary embodiment of the present invention. The controller 170 may include a touch gesture sensor 171, a touch gesture discriminator 172, and a key pad display control unit 173. The touch gesture sensor 171 is connected to the touch screen 110, detects a touch gesture of a user with respect to the touch screen 110, and transfers detected information to the touch gesture discriminator 172. Here, the detected information may include touch coordinates, a moving direction of a touch, a moving distance of the touch, and a form of a touch gesture. The touch gesture discriminator 172 discriminates the meaning of the detected touch gesture. In particular, the touch gesture discriminator 172 discriminates whether the detected touch gesture is a zoom-out requesting thumbnail calling or accessing, a zoom-out requesting reduction of a key pad, a zoom-in requesting enlargement of the key pad, or a touch gesture requesting movement of the key pad in a displayed state of the key pad. The key pad display control unit 173 receives image data corresponding to the key pad from the memory 140. Further, the key pad display controller 173 controls the display unit 130 to display the key pad. Moreover, the key pad display control unit 173 receives a discrimination result associated with the key pad from the touch gesture discriminator 172. When the received discrimination result corresponds to thumbnail calling or accessing, the key pad display controller 173 receives thumbnails from the memory 140, and controls the display unit 130 to display the received thumbnails. When the received discrimination result corresponds to the reduction of the key pad, the key pad display controller 173 reduces the key pad and controls the display unit 130 to display the reduced key pad. When the displayed discrimination result corresponds to the enlargement of the key pad, the key pad display controller 173 enlarges the key pad and controls the display unit 130 to display the enlarged key pad. When the received discrimination result corresponds to movement of the key pad, the key pad display controller 173 moves the key pad in a moving direction of the detected touch gesture.

Since the structural elements can be variously changed according to convergence trends of digital devices known in the art, the portable terminal 100 may include any known components and elements to implement the functions of the portable terminal 100 as well as to implement the preset invention. The portable terminal 100 may further include constructions that are not mentioned or described in detail, such as a sensor module for detecting information associated with a location change of the portable terminal, a GPS module for determining a location of the portable terminal 100, and a camera module. The portable terminal 100 of the present invention may be substituted by specific constructions and implementations of the present invention as described herein. Hereinafter, a method for displaying a key pad performed by the foregoing portable terminal 100 will be described in detail with reference to FIGS. 3 to 5.

Figure 3:
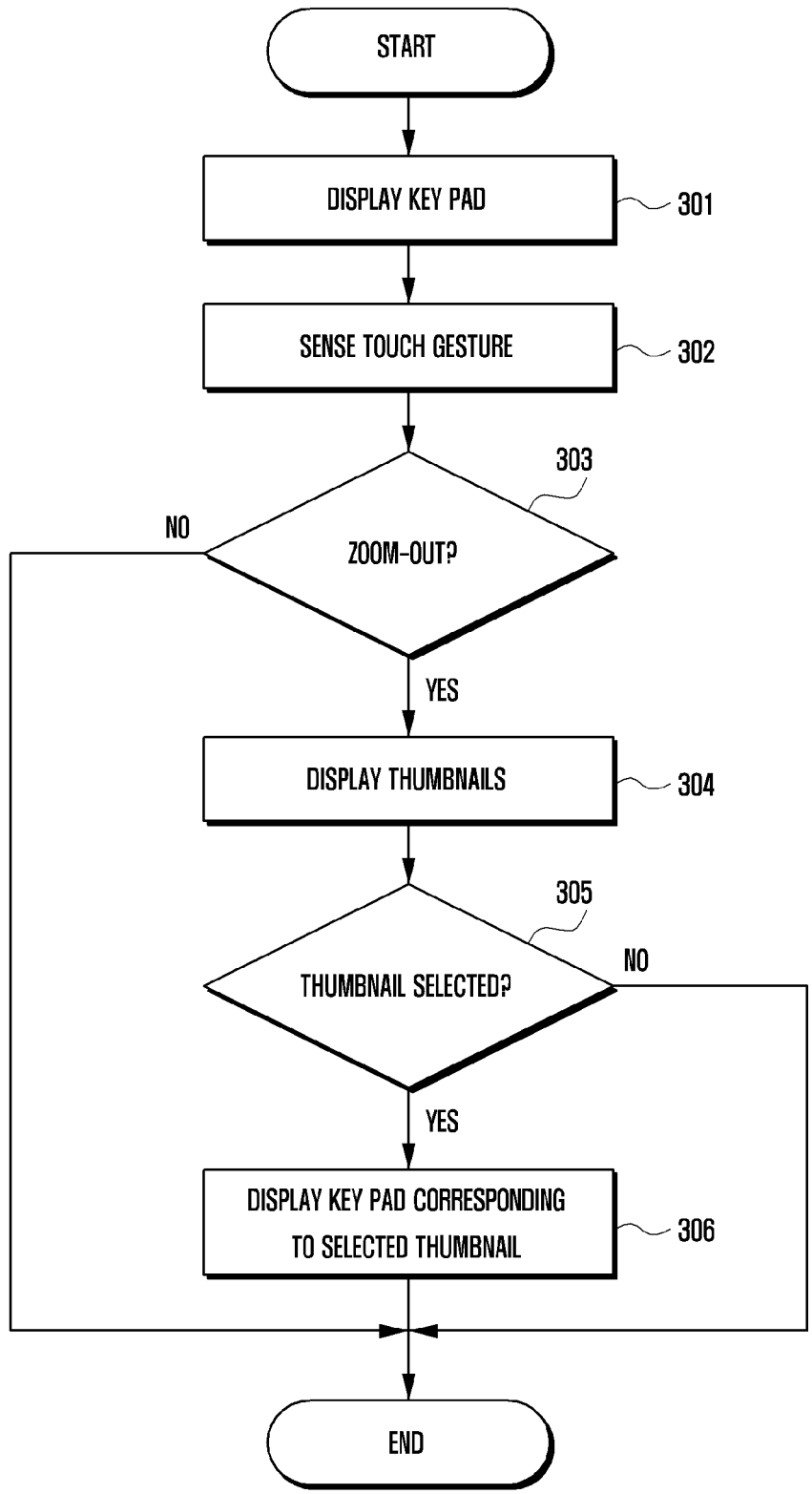
FIG. 3 is a flowchart illustrating a method for displaying a key pad according to the exemplary embodiment of the present invention.

FIG. 3 is a flowchart illustrating a method for displaying a key pad according to the exemplary embodiment of the present invention. Referring to FIG. 3, the display unit 130 may display one of various key pads in step 301. While the key pad is being displayed, the controller 170 detects or senses a touch gesture in step 302. The controller 170 determines whether the detected touch gesture is zoom-out in step 303. If not, the method ends; otherwise, the method proceeds to step 304. A touch gesture in which a user reduces an interval between two fingers in a touched state on the touch screen 110 may be a representative example of the zoom-out. The zoom-out is not limited to the touch gesture, and so may also include the sweep or drag as examples of the zoom-out.

When the detected touch gesture is the zoom-out in step 303, the controller 170 controls a display unit 130 to display thumbnails in step 304. If one of the thumbnails is selected by the user while the thumbnails are being displayed, the controller 170 detects the selection of the thumbnail in step 305 and the method proceeds to step 306; otherwise, if no thumbnail in selected, the method ends. Next, the controller 170 controls the display unit 130 to display a key pad corresponding to the selected thumbnail in step 306. As described above, to change the key pad, the user may call or access thumbnails by a simple touch operation. Further, the user may intuitively recognize key pads through called or accessed thumbnails and easily and rapidly select a desired key pad based on the recognition.

Figure 4:
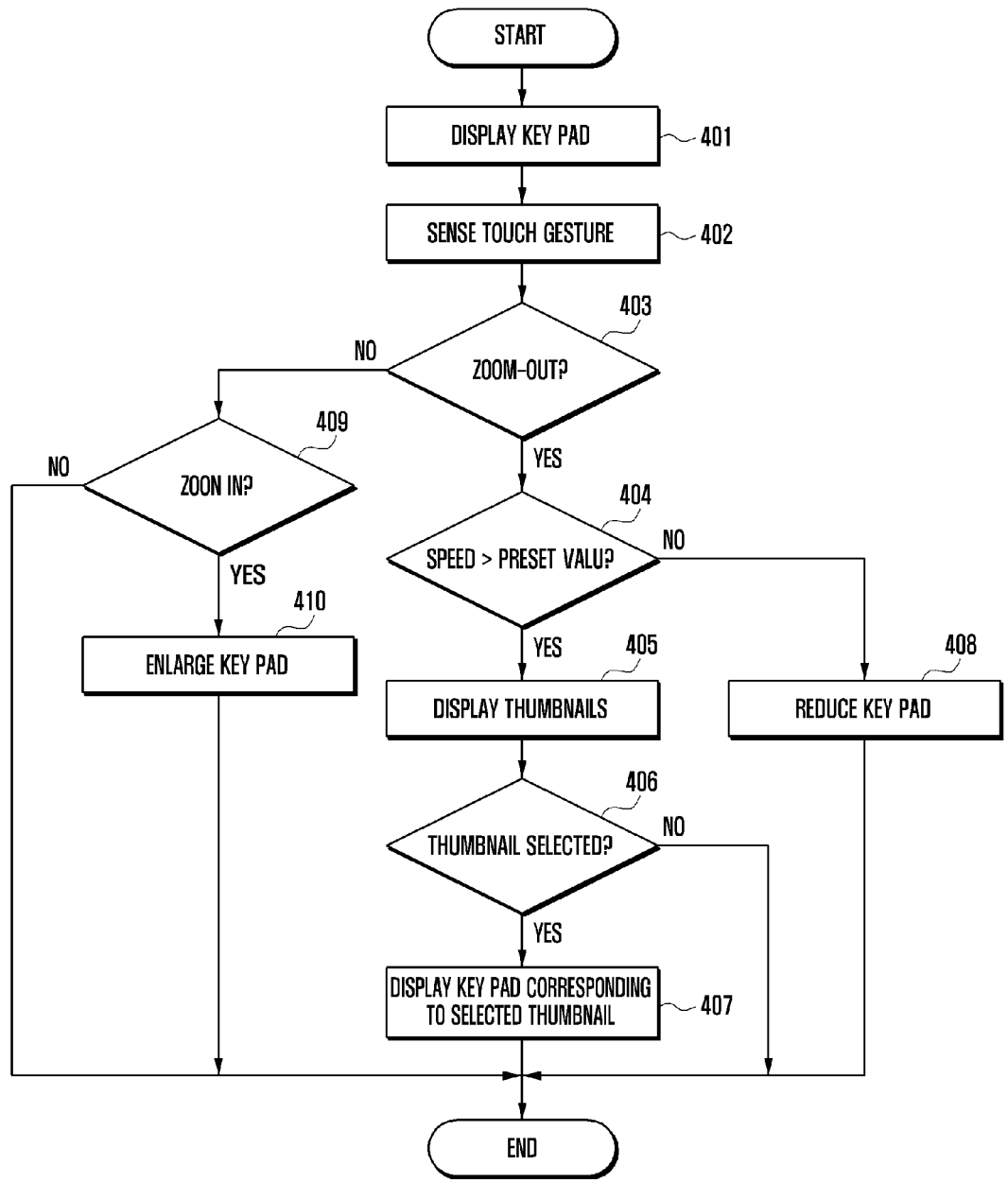
FIG. 4 is a flowchart illustrating a method for displaying a key pad according to another exemplary embodiment of the present invention.

FIG. 4 is a flowchart illustrating a method for displaying a key pad according to another exemplary embodiment of the present invention. Referring to FIG. 4, a display unit 130 may display one of various key pads in step 401. A controller 170 detects or senses a touch gesture while a key pad is being displayed in step 402. The controller 170 determines whether the detected touch gesture is zoom-out in step 403.

When the detected touch gesture is zoom-out, the controller 170 computes the speed of the zoom-out. The controller 170 compares the computed speed of the zoom-out with a preset value in step 404. When the computed speed of the zoom-out is greater than the preset value in step 404, the controller 170 controls a display unit 130 to display thumbnails in step 405. If one of the thumbnails is selected by the user while the thumbnails are being displayed, the controller 170 detects selection of the thumbnail in step 406 and proceeds to step 407; otherwise, if no thumbnail is selected in step 406, the method ends. In step 407, the controller 170 controls the display unit 130 to display a key pad corresponding to the selected thumbnail.

Referring back to step 404, when the computed speed of the zoom-out is less than or equal to the preset value at step 404, the controller 170 reduces the key pad, and may control the display unit 130 to display the reduced key pad in step 408, and the method ends. Here, the thumbnail calling and reduction of the key pad may be distinguished based on the speed of the zoom-out. Additional factors for distinguishing the thumbnail calling and reduction of the key pad may be the size of pinch or the key pad as mentioned above.

Referring back to step 403, when the detected touch gesture is not the zoom-out, the process proceeds to step 409. The controller 170 determines whether the detected touch gesture is zoom-in in step 409. If not a zoom-in, the method ends; otherwise, when the detected touch gesture is zoom-in, the controller 170 may enlarge the key pad, and control the display unit 130 to display the enlarged key pad in step 410. As described above, the user may call or access thumbnails by a simple touch operation to easily and rapidly change a desired key pad. Further, the user may enlarge or reduce the key pad to a desired size by a simple touch operation.

Figure 5:
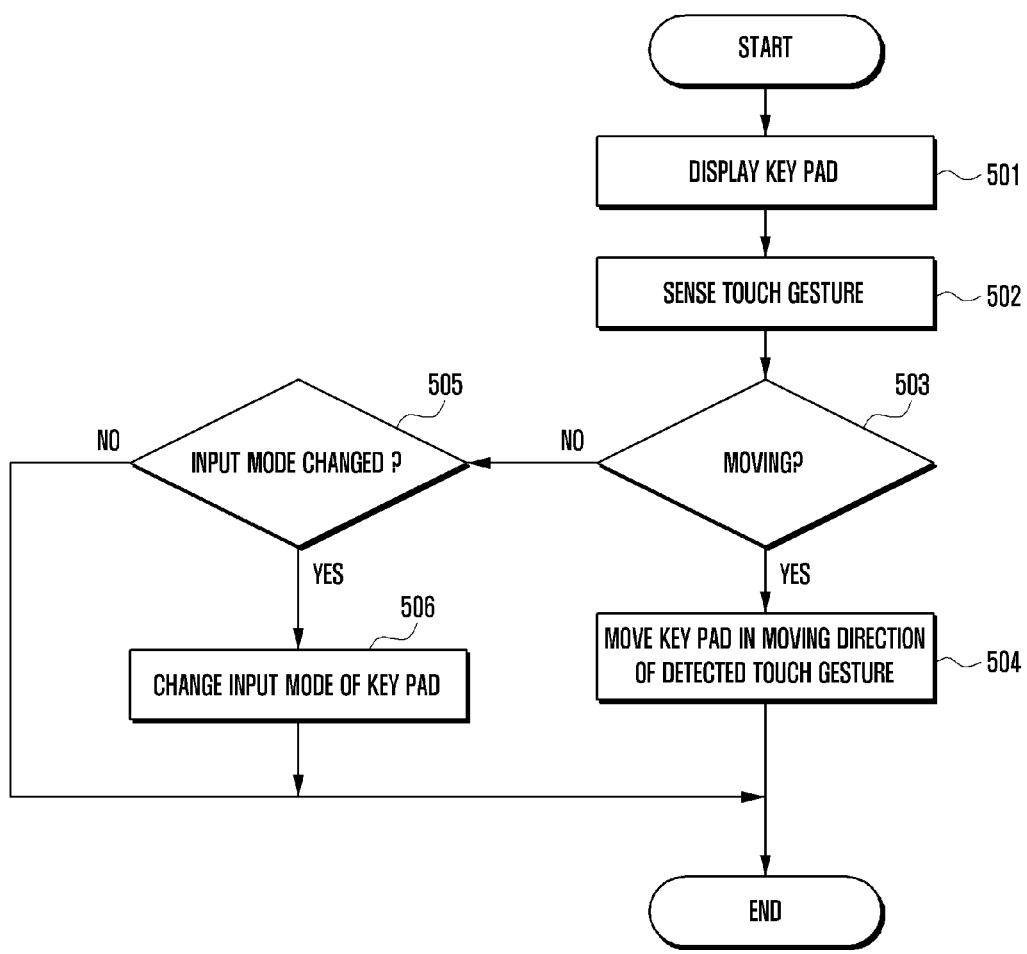
FIG. 5 is a flowchart illustrating a method for displaying a key pad according to a further exemplary embodiment of the present invention.

FIG. 5 is a flowchart illustrating a method for displaying a key pad according to a further exemplary embodiment of the present invention. Referring to FIG. 5, a display unit 130 may display a key pad in step 501. A controller 170 detects or senses a touch gesture while the key pad is being displayed in step 502. The controller 170 determines whether the detected touch gesture is a touch gesture for moving the key pad in step 503. Here, the touch gesture for moving the key pad becomes a touch gesture having mobility. However, it is preferable that the touch gesture for moving the key pad has mobility but is distinguished from the foregoing zoom-out and zoom-in. Accordingly, drag or multi-drag gestures may be representative examples of the touch gesture for moving the key pad. Here, if the drag is a touch gesture of moving one finger touched on a key pad, the multi-drag is a touch gesture of moving at least two fingers touched on the key pad in the same direction. Referring back to FIG. 5, when the detected touch gesture is a touch gesture for moving the key pad at step 503, the controller 170 moves the key pad in a moving direction of the detected touch gesture in step 504, and the process ends. However, when the detected touch gesture is not the touch gesture for moving the key pad at step 503, the process proceeds to step 505.

In step 505, the controller 170 determines whether the detected touch gesture is a touch gesture for changing an input mode. Here, the touch gesture for changing the input mode is distinguished from the touch gesture for moving the key pad. For example, when the drag is allocated as a touch gesture for changing the input mode, multi-drag may be allocated as a touch gesture for moving the key pad. In addition, the touch gesture for changing the input mode does not need to have mobility, and accordingly a long tap may be allocated as the touch gesture for changing the input mode according to a used environment.

When the detected touch gesture is the touch gesture for changing an input mode in step 505, the controller 170 changes the input mode of the key pad in step 506; otherwise, the process ends. For example, the controller 170 changes the input mode of the key pad from an English input mode to a sign or symbol input mode; for example, to display numbers and punctuation marks, or alternatively to display symbols and characters in languages which do not use the Latin alphabet. As described above, the user may move the key pad to a desired location on the touch screen 110 by a simple touch operation. Further, the user may change the input mode of the key pad by the simple touch operation.

Hereinafter, a method and an apparatus for displaying a key pad according to the present invention will be described in detail with reference to exemplary diagrams of a plurality of screens.

Figure 6:
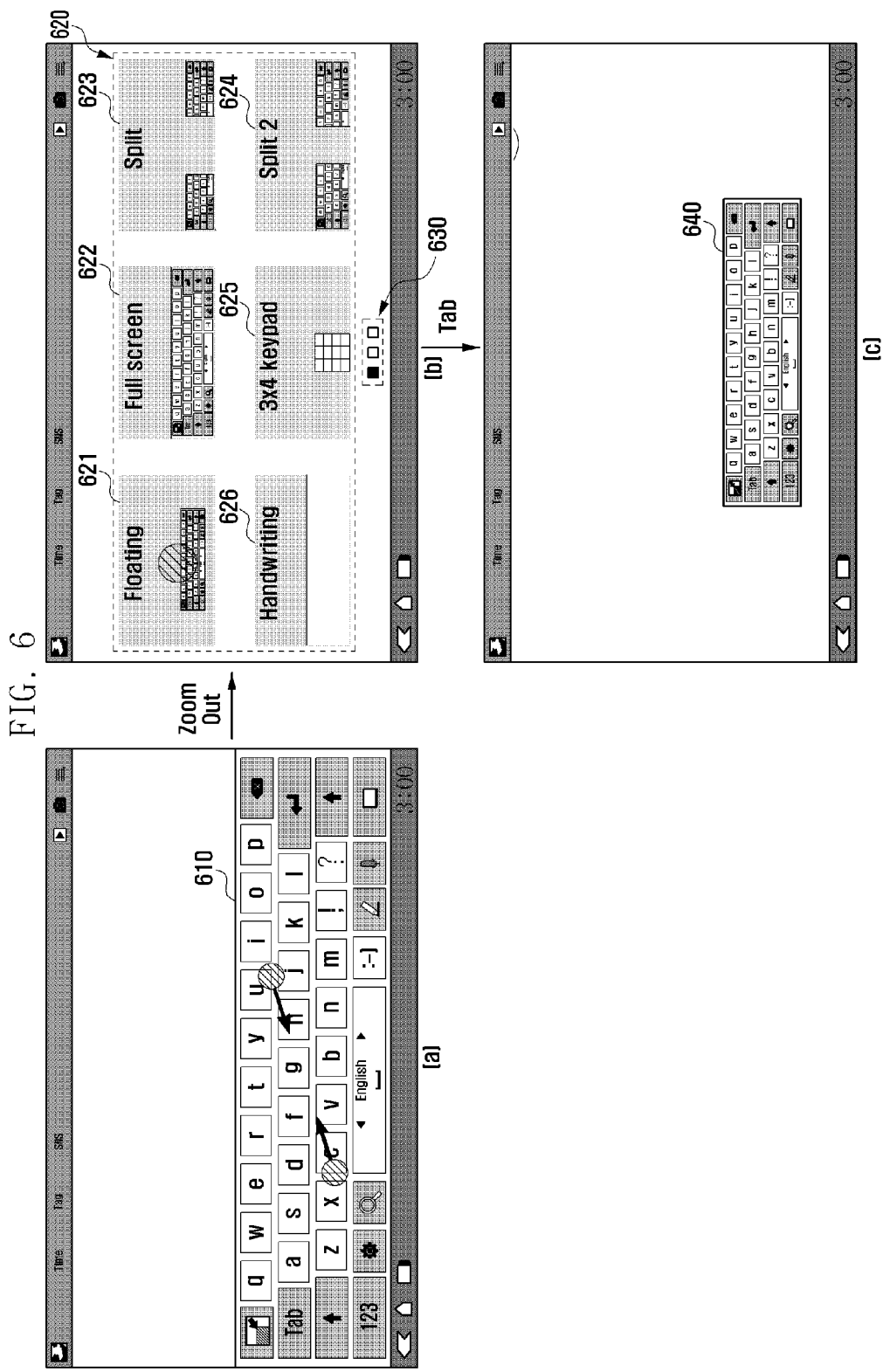
FIGS. 6A-6C are diagrams illustrating screens for describing a method for selecting a key pad according to the exemplary embodiment of the present invention.

FIGS. 6A-6C are diagrams illustrating screens for describing a method for selecting a key pad according to the exemplary embodiment of the present invention. Referring to FIG. 6A, a display unit 130 displays a key pad 610. The user may zoom-out the key pad 610 in this state. For example, as shown in FIG. 6A, the user may move two fingers touched on the key pad 610 towards each other, such as, in an illustrative example only, pressing between the "j" and "u" keys with one finger and pressing between the "x" and "c" keys with another finger, represented by the shaded circles in FIG. 6A, and then moving such fingers together. Accordingly, the controller 170 may detect zoom-out of the key pad 610. Referring to FIG. 6A, the controller 170 determines the detected zoom-out as a touch gesture requesting thumbnail calling or accessing, and controls the display unit 130 to display a thumbnail list 620 based on the determination in FIG. 6B. The display unit 130 may display thumbnails indicating key pads of various types, respectively. For example, as shown in FIG. 6B, the display unit 130 may display a thumbnail 621 indicating a movable floating key pad on a partial screen as illustrated in FIG. 6C, a thumbnail 622 indicating a full screen key pad fully filled in left and right sides of a screen or sub-screen as illustrated in FIG. 6A, thumbnails 623 and 624 indicating two different splitting key pads split into left/right sides of the screen, a thumbnail 625 indicating a 3*4 key pad, and a thumbnail 626 indicating a handwriting recognition screen. In addition, besides the thumbnails 621-626 shown in FIG. 6B, there may further be displayed at least one other thumbnail or icon. If a touch gesture (e.g., the touch gesture may be flick) is input requesting a list change in a displayed state of the thumbnail list 620 as illustrated in FIG. 6B, the controller 170 may control the display unit 130 such that another thumbnail list is displayed. Further, the controller 170 may control display of an indicator 630 such that a user recognizes the number of the available thumbnail lists and a relative location of a currently displayed thumbnail list 620. If there is only one thumbnail list 620, the display of the indicator 630 may be omitted.

Referring to FIG. 6B, the user may tap a thumbnail 621, represented by the shaded circle overlapping the thumbnail 621, indicating the selection of a floating key pad from the thumbnail list 620. Then, the controller 170 detects the tap with respect to the thumbnail 621, and determines the detected tap as a touch gesture requesting display of a floating key pad. The controller 170 controls the display unit 130 to display the floating key pad 640 in FIG. 6C based on the determination.

Figure 7:
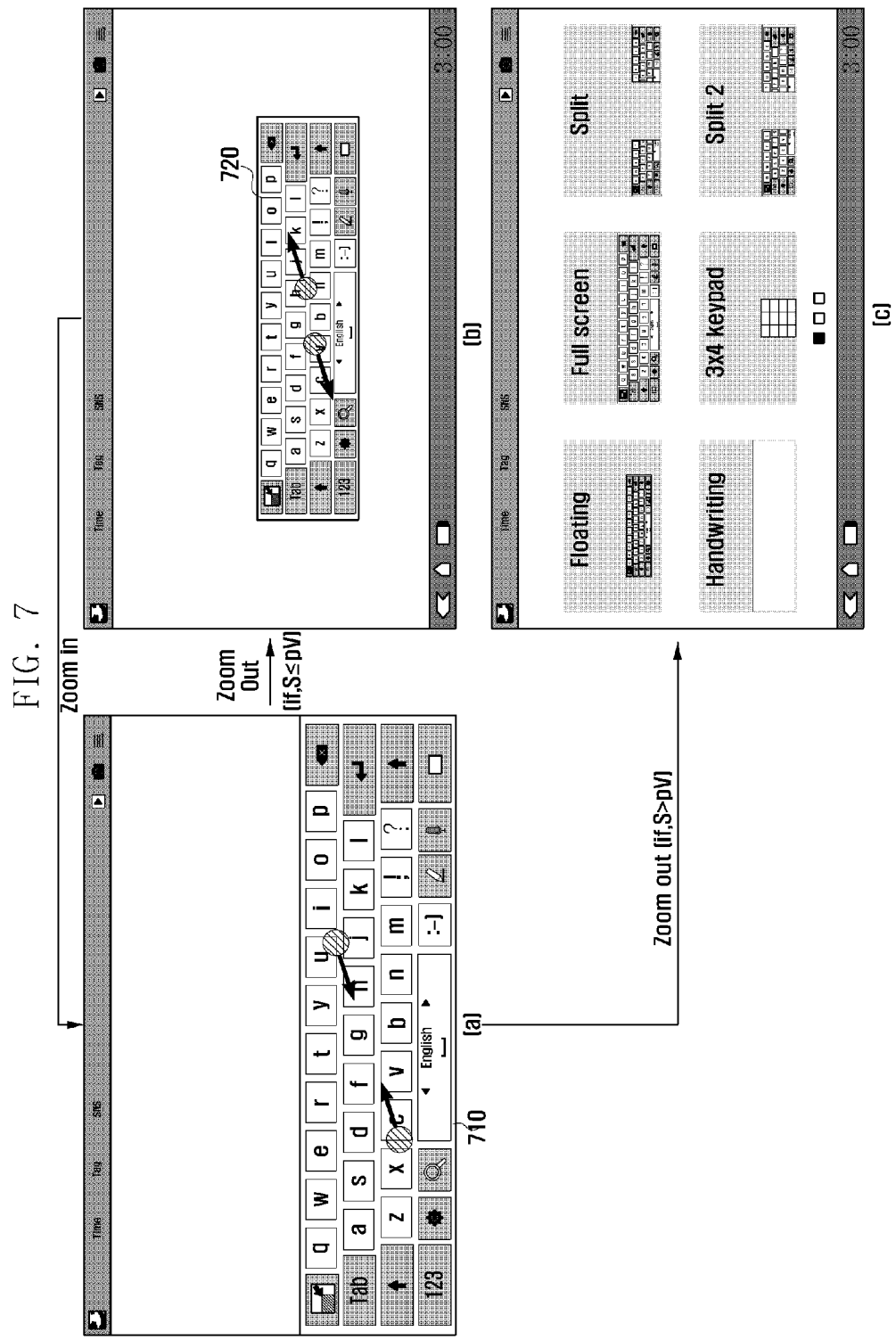
FIGS. 7A-7C are diagrams illustrating screens for describing a method for calling or accessing a thumbnail and changing the size of the key pad according to the exemplary embodiment of the present invention.

FIGS. 7A-7C are diagrams illustrating screens for describing a method for calling or accessing a thumbnail and changing the size of the key pad according to the exemplary embodiment of the present invention. Referring to FIG. 7A, a display unit 130 displays a full screen key pad 710. A user may zoom-out the full screen key pad 710 in this state, represented by the shaded circles. Then, the controller 170 detects the zoom-out and computes a speed S of the detected zoom-out; that is, a closer distance between two fingers per unit time. Further, the controller 170 compares the computed speed S with a first preset value pV. When the computed speed S is less than or equal to the first preset value pV, the controller 170 determines the detected zoom-out as a touch gesture requesting reduction of a key pad. As shown in FIG. 7B, the controller 170 may reduce the full screen key pad 710 to a floating key pad 720 and controls the display unit 130 to display the floating key pad 720.

However, when the computed speed S is greater than the first preset value pV, the controller 170 determines the detected zoom-out as a touch gesture requesting thumbnail calling or accessing. As illustrated in FIG. 7C, the controller 170 controls the display unit 130 such that the thumbnail list is displayed based on the determination.

In addition, referring to FIG. 7B, the user may zoom-out the floating key pad 720 in the displayed state of the floating key pad 720, represented by the shaded circles in FIG. 7B indicating a zoom-in. Then, the controller 170 detects zoom-in and determines the detected zoom-in as a touch gesture requesting enlargement of the key pad, as shown in FIG. 7A. The controller 170 may enlarge the floating key pad 720 to the full screen key pad 710 and controls the display unit 130 to display the full screen key pad 710 in FIG. 7A.

Figure 8:
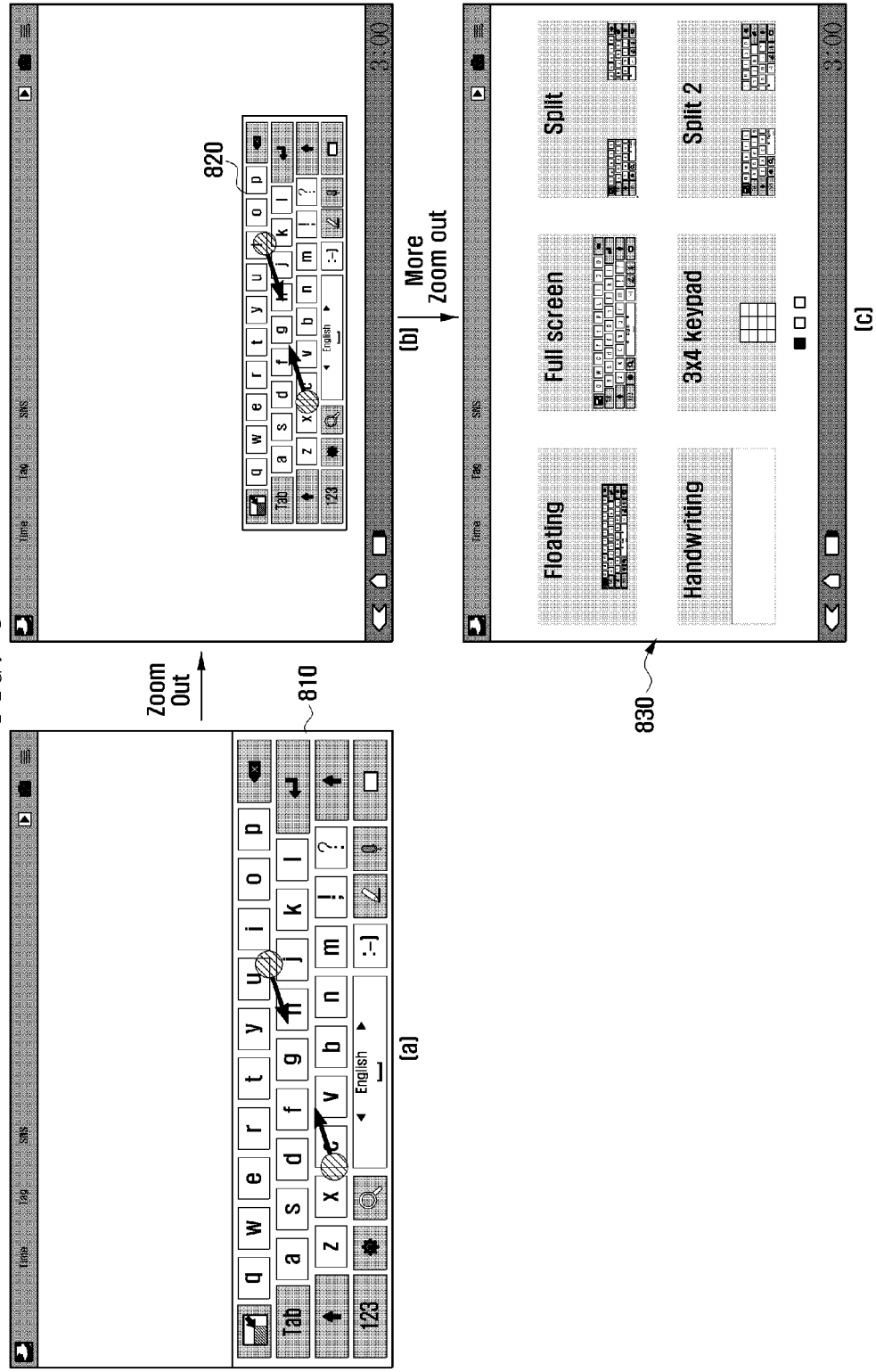
FIGS. 8A-8C are diagrams illustrating screens for describing a method for calling or accessing a thumbnail and changing the size of the key pad according to another exemplary embodiment of the present invention.

FIGS. 8A-8C are diagrams illustrating screens for describing a method for calling or accessing a thumbnail and changing the size of the key pad according to another exemplary embodiment of the present invention. Referring to FIG. 8A, the display unit 130 displays the full screen key pad 810. The user may zoom-out the full screen key pad 810 in this state, represented by the shaded circles in FIG. 8A. Then, the controller 170 detects zoom-out and determines the detected zoom-out as a touch gesture requesting reduction of the key pad. As illustrated in FIG. 8B, the controller 170 reduces the full screen key pad 810 to the floating key pad 820 and controls the display unit 130 to display the floating key pad 820. In this state, the user may further perform zoom-out, represented by the shaded circles in FIG. 8B. In this case, the controller 170 computes a pinch gesture, which is a distance between two fingers, of the detected zoom-out or the size of the floating key pad 820. When the pinch of the detected zoom-out or the size of the floating key pad 820 is less than a second preset value, the controller 170 determines the detected zoom-out as a touch gesture requesting thumbnail calling or accessing. Based on the determination, the controller 170 may control the display unit 130 such that the thumbnail list 830 is displayed as illustrated in FIG. 8C.

Figure 9:
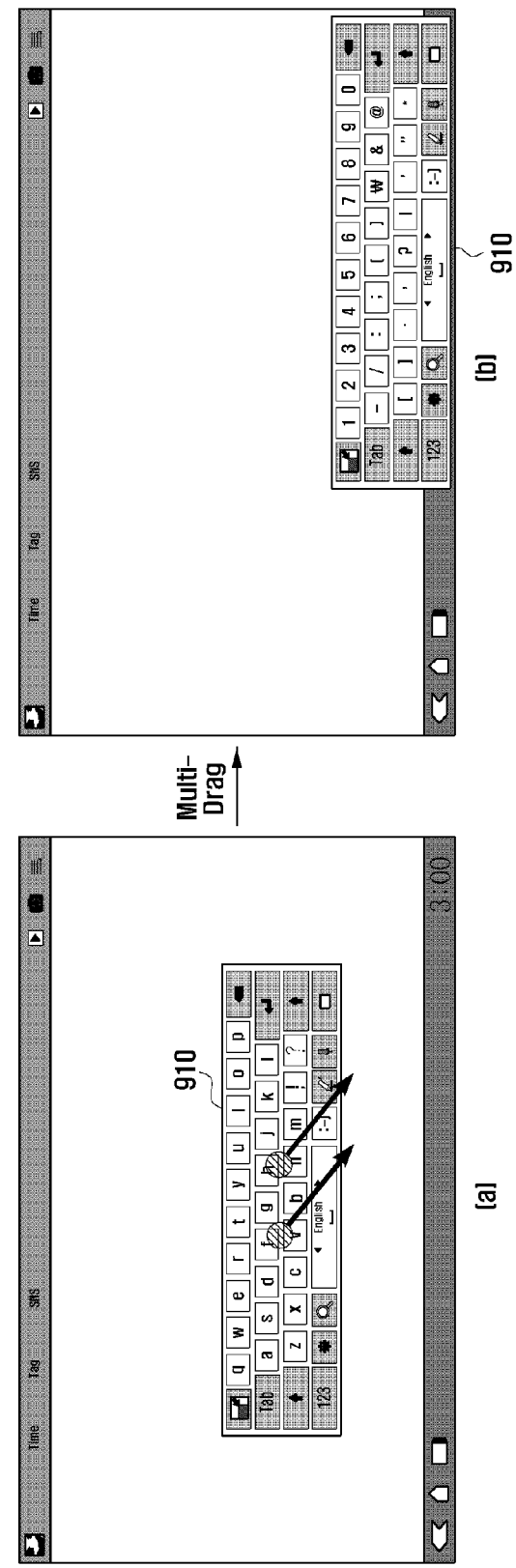
FIGS. 9A-9B are diagrams illustrating screens for describing a method for moving the key pad according to the exemplary embodiment of the present invention.

FIGS. 9A-9B are diagrams illustrating screens for describing a method for moving the key pad according to the exemplary embodiment of the present invention. Referring to FIG. 9A, a display unit 130 displays the floating key pad 910. In this state, the user may multi-drag the floating key pad 910, represented by the shaded circles in FIG. 9A. Accordingly, the controller 170 detects multi-drag with respect to the floating key pad 910, and determines the detected multi-drag as a touch gesture requesting movement of the key pad 910. Further, the controller 170 moves the floating key pad 910 in a moving direction of the drag. In this case, the key pad 910 may be restrictively moved in a screen. That is, the controller 170 may control the display of the key pad 910 to prevent a part of the key pad 910 from being separated from the screen; that is, the movement of the key pad 910 is stopped at the border of the screen, as shown in FIG. 9B, and the controller 170 does not crop or modify the appearance of the key pad 910 to represent a part of the key pad 910 being "off" the viewable portion of the screen.

Figure 10:
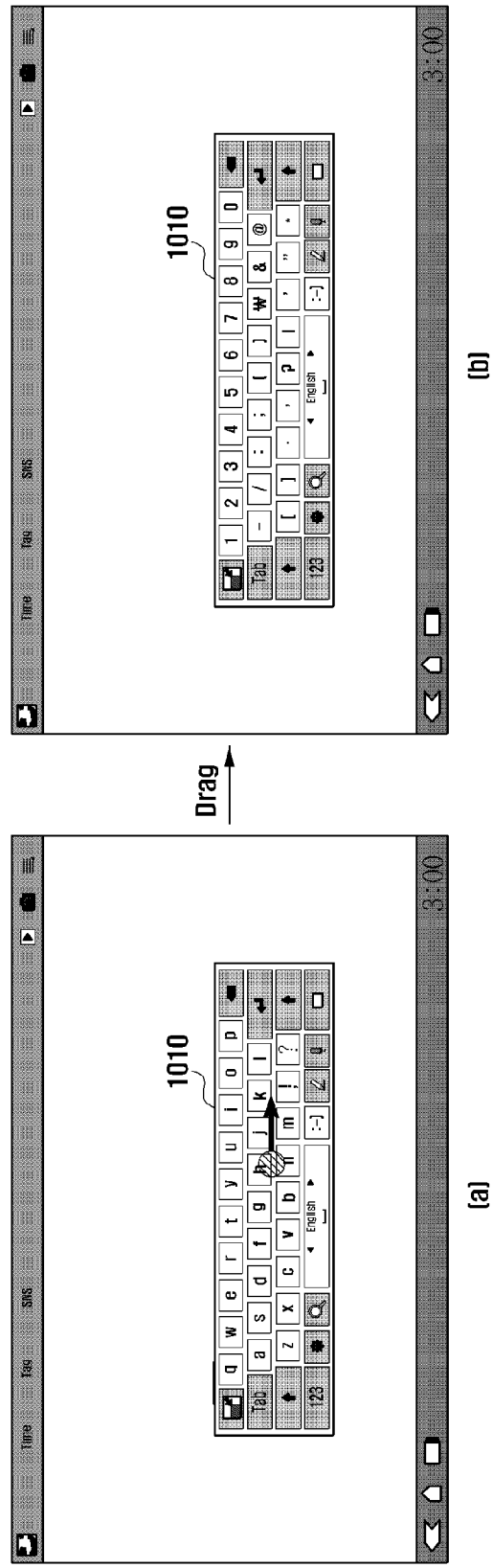
FIGS. 10A-10B are diagrams illustrating screens for describing a method for changing an input mode of the key pad according to the exemplary embodiment of the present invention.

FIGS. 10A-10B are diagrams illustrating screens for describing a method for changing an input mode of the key pad according to the exemplary embodiment of the present invention. Referring to FIG. 10A, a display unit 130 displays a floating key pad 1010 having an English input mode. The user may drag the floating key pad 101 in this state as shown, for example, by the shaded circle in FIG. 10A representing the touch of a user's finger to the screen. Accordingly, the controller 170 detects drag and determines the detected drag as a touch gesture requesting change of an input mode. As shown in FIG. 10B, the controller 170 changes an input mode of the floating key pad 1010 from an English input mode to a sign or symbol input mode, for example, to display numbers and punctuation marks as well as other symbols, or alternatively to display symbols and characters in languages which do not use the Latin alphabet.

The foregoing method for displaying a key pad of the present invention may be implemented in an executable program command form by various computer components and apparatus and may be recorded in a computer readable recording medium. In this case, the computer readable recording medium may include an executable computer program, a program command, a data file, and a data structure individually or a combination thereof. The above-described apparatus and methods according to the present invention can be implemented in hardware, firmware or as software or computer code that can be stored in a recording medium such as a CD ROM, a RAM, a ROM, a floppy disk, DVDs, a hard disk, a magnetic storage media, an optical recording media, or a magneto-optical disk or computer code downloaded over a network originally stored on a remote recording medium, a computer readable recording medium, or a non-transitory machine readable medium and to be stored on a local recording medium, so that the methods described herein can be rendered in such software that is stored on the recording medium using a general purpose computer, a digital computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, the program may be electronically transferred through any media such as communication signals transmitted by wire/wireless connections, and their equivalents.

As mentioned above, in a method and an apparatus for displaying a key pad according to the present invention, a user may easily and rapidly select a desired key pad from various key pads.

Although a method and an apparatus for displaying a key pad according to exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for displaying a keypad in a terminal having a touch screen, the method comprising:
   displaying the keypad in a first keypad configuration and detecting a touch gesture performed on the keypad;
   in response to the touch gesture satisfying a condition, reducing a size of the displayed keypad into a keypad thumbnail by shrinking a boundary that circumferentially encloses all keys displayed within the keypad;
   displaying a plurality of thumbnails including the keypad thumbnail, each thumbnail of the plurality displaying an image of a different keypad configuration;
   detecting, via the touch screen, a selection of a thumbnail from the plurality that is associated with a second keypad configuration; and
   in response to the selection of the thumbnail, displaying the keypad in the second keypad configuration.

2. The method of claim 1, wherein the touch gesture includes a pinch gesture comprising two touch points, the method further comprising:
   while the pinch gesture is performed, changing a size of the keypad until a predetermined distance between the two touch points is reached; and
   hiding the keypad when the predetermined distance is reached,
   wherein the plurality of thumbnails is displayed when the keypad is hidden, and the condition is satisfied when the predetermined distance is reached.

3. The method of claim 1, further comprising:
   determining whether the touch gesture satisfies the condition by comparing a speed of the touch gesture with a threshold;
   in response to detecting that the speed of the gesture is greater than the threshold, reducing the size of the keypad and accessing the plurality of thumbnails for display; and
   in response to detecting that the speed of the gesture is less than the threshold, reducing the size of the keypad without accessing the plurality of thumbnails such that the plurality of thumbnails is undisplayed, and
   wherein the condition is satisfied when the speed of the gesture is greater than the threshold.

4. The method of claim 1, wherein the touch gesture includes a pinch comprising a first touch point and a second touch point, and the condition is satisfied when a distance between the first touch point and the second touch point is less than a threshold.

5. The method of claim 1, wherein the condition is satisfied when the touch gesture is a zoom-out gesture, further comprising:
   reducing a size of the keypad in response to the zoom-out gesture;
   detecting a current size of the keypad while the size of the keypad is being reduced; and
   comparing the current size of the keypad with a threshold, wherein the condition is satisfied when the size of the keypad falls below the threshold.

6. The method of claim 1, further comprising enlarging the keypad when the touch gesture is a zoom-in gesture.

7. The method of claim 1, wherein the first configuration is a full-screen configuration and the second configuration is a split-screen configuration.

8. The method of claim 1, further comprising moving the keypad in accordance with the touch gesture when the condition is not satisfied.

9. The method of claim 8, wherein the keypad is moved in response to the touch gesture being one in which at least two fingers slide over the keypad in the same direction while maintaining contact with the touch screen.

10. The method of claim 1, wherein each of the thumbnails comprises at least one of text and an image indicating the keypad configuration that is associated with the thumbnail.

11. An apparatus for displaying a keypad, the apparatus comprising:
   a touch screen; and
   a controller configured to:
   display the keypad in a first keypad configuration;
   detect, via the touch screen, a touch gesture that is performed on the keypad;
   in response to the touch gesture satisfying a condition, reducing a size of the displayed keypad into a keypad thumbnail by shrinking a boundary that circumferentially encloses all keys displayed within the keypad;

display a plurality of thumbnails including the keypad thumbnail, each thumbnail of the plurality displaying an image of a different keypad configuration;

detect a selection of a thumbnail from the plurality that is associated with a second keypad configuration; and in response to the selection of the thumbnail, display the keypad in the second keypad configuration.

12. The apparatus of claim 11, wherein the touch gesture includes a pinch gesture comprising two touch points, and the controller is further configured to:

while the pinch gesture is performed, change a size of the keypad until a predetermined distance between the two touch points is reached; and hide the keypad when the predetermined distance is reached, wherein the plurality of thumbnails is displayed when the keypad is hidden, and the condition is satisfied when the predetermined distance is reached.

13. The apparatus of claim 11, wherein the controller is further configured to:

determine whether the touch gesture satisfies the condition by comparing a speed of the gesture is less than a threshold, and in response to detecting that the speed of the gesture is greater than the threshold, reducing the size of the displayed keypad and accessing the plurality of thumbnails for display, in response to detecting that the speed of the gesture is less than the threshold, reducing the size of the keypad without accessing the plurality of thumbnails such that the plurality of thumbnails is undisplayed, wherein the condition is satisfied when the speed of the gesture is greater than the threshold.

14. The apparatus of claim 11, wherein the touch gesture includes a pinch comprising a first touch point and a second touch point, and the condition is satisfied when a distance between the first touch point and the second touch point is less than a threshold.

15. The apparatus of claim 11, wherein the condition is satisfied when the touch gesture is a zoom-out gesture, and the controller reduces a size of the keypad in response to the zoom-out gesture, detects a current size of the keypad while the keypad is being reduced, wherein the condition is satisfied when the size of the keypad falls below a threshold.

16. The apparatus of claim 11, wherein the controller enlarges the keypad when the touch gesture is a zoom-in gesture.

17. The apparatus of claim 11, wherein the controller moves the keypad on in accordance with the touch gesture when the condition is not satisfied.

18. The apparatus of claim 17, wherein the keypad is moved in response to the touch gesture being one in which at least two fingers slide over the keypad in the same direction.

19. The apparatus of claim 11, wherein each of the thumbnails comprises at least one of text and an image indicating the keypad configuration that is associated with the thumbnail.

* * * * *